US005497343A

United States Patent [19]
Rarick

[11] Patent Number: 5,497,343
[45] Date of Patent: Mar. 5, 1996

[54] REDUCING THE NUMBER OF CARRY-LOOK-AHEAD ADDER STAGES IN HIGH-SPEED ARITHMETIC UNITS, STRUCTURE AND METHOD

[75] Inventor: Leonard D. Rarick, San Marcos, Calif.

[73] Assignee: Hyundai Electronics America, Milpitas, Calif.

[21] Appl. No.: 102,663

[22] Filed: Aug. 5, 1993

[51] Int. Cl.[6] ..................................................... G06F 7/50
[52] U.S. Cl. .......................................... 364/787; 364/745
[58] Field of Search .................................. 364/787, 786, 364/745

[56] References Cited

U.S. PATENT DOCUMENTS

| | | | |
|---|---|---|---|
| 4,623,981 | 11/1986 | Wolrich et al. | 364/787 |
| 4,660,165 | 4/1987 | Masumoto | 364/787 |
| 4,764,886 | 8/1988 | Yano | 364/787 |
| 4,949,297 | 8/1990 | Matsuoka | 364/787 |
| 5,278,783 | 1/1994 | Edmondson | 364/787 |

*Primary Examiner*—David H. Malzahn
*Attorney, Agent, or Firm*—Townsend and Townsend Khourie and Crew

[57] ABSTRACT

A carry-look-ahead adder for adding an addend and an augend and generating a final sum. The addend, augend, and final sum are binary numbers, each having a plurality of bits. Bits of the same order in the addend and the augend are organized into columns. The adder has at least one data reduction stage, each data reduction stage having at least one multi-column full adder. The data reduction stages use the columns of addend and augend bits to generate a reduced addend and a reduced augend, with the reduced augend having fewer bits than the augend. A generate/propagate calculation stage then uses the reduced addend and the reduced augend for calculating generate and propagate data, the generate/propagate calculation stage having been modified to account for the reduction of the addend and augend. A carry-generate stage then uses the generate and propagate data to generate at least one final carry. Finally, a final sum calculation stage uses the reduced addend, the reduced augend, and the final carries for calculating the final sum. The data reduction stages reduce the inputs to the generate/propagate calculation stage thereby reducing the number of inputs to the carry-generate circuit. With fewer inputs, the number of stages in the carry-generate circuit can be reduced, thus resulting in a faster implementation of the carry-look-ahead adder.

10 Claims, 17 Drawing Sheets

| $A_k$ | $B_k$ | $G_k$ | $P_k$ |
|---|---|---|---|
| 0 | 0 | 0 | 0 |
| 1 | 0 | 0 | 1 |
| 0 | 1 | 0 | 1 |
| 1 | 1 | 1 | 0 |
FIG. 2a.
PRIOR ART
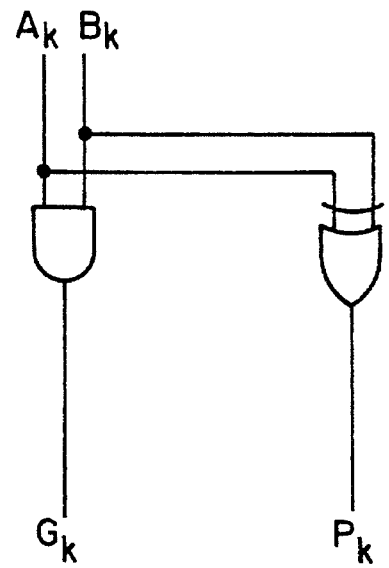
FIG. 2b.
PRIOR ART
| $P_k$ | $C_k$ | $S_k$ |
|---|---|---|
| 0 | 0 | 0 |
| 0 | 1 | 1 |
| 1 | 0 | 1 |
| 1 | 1 | 0 |
FIG. 3a.
PRIOR ART
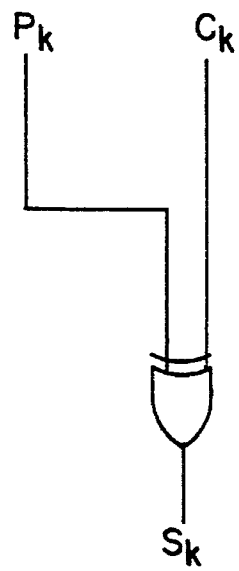
FIG. 3b.
PRIOR ART

| 52 | | | | 54 | | |
|---|---|---|---|---|---|---|
| $A_{k+1}$ | $A_k$ | $B_{k+1}$ | $B_k$ | $E_{k+2}$ | $D_{k+1}$ | $D_k$ |
| 0 | 0 | 0 | 0 | 0 | 0 | 0 |
| 0 | 0 | 0 | 1 | 0 | 0 | 1 |
| 0 | 0 | 1 | 0 | 0 | 1 | 0 |
| 0 | 0 | 1 | 1 | 0 | 1 | 1 |
| 0 | 1 | 0 | 0 | 0 | 0 | 1 |
| 0 | 1 | 0 | 1 | 0 | 1 | 0 |
| 0 | 1 | 1 | 0 | 0 | 1 | 1 |
| 0 | 1 | 1 | 1 | 1 | 0 | 0 |
| 1 | 0 | 0 | 0 | 0 | 1 | 0 |
| 1 | 0 | 0 | 1 | 0 | 1 | 1 |
| 1 | 0 | 1 | 0 | 1 | 0 | 0 |
| 1 | 0 | 1 | 1 | 1 | 0 | 1 |
| 1 | 1 | 0 | 0 | 0 | 1 | 1 |
| 1 | 1 | 0 | 1 | 1 | 0 | 0 |
| 1 | 1 | 1 | 0 | 1 | 0 | 1 |
| 1 | 1 | 1 | 1 | 1 | 1 | 0 |

50 k+2   k+1    k
[4]    [2]    [1]

| $D_k$ | $E_k$ | $D_{k-1}$ | $E_{k-1}$ | $G_{k,k-1}$ | $P_{k,k-1}$ |
|---|---|---|---|---|---|
| 0 | 0 | 0 | 0 | 0 | 0 |
| 1 | 0 | 0 | 0 | 0 | 0 |
| 0 | 1 | 0 | 0 | 0 | 0 |
| 1 | 1 | 0 | 0 | 1 | 0 |
| 0 | 0 | 1 | 0 | 0 | 0 |
| 1 | 0 | 1 | 0 | 0 | 1 |
| 0 | 1 | 1 | 0 | 0 | 1 |
| 1 | 1 | 1 | 0 | 1 | 0 |
| 0 | 0 | 0 | 1 | 0 | 0 |
| 1 | 0 | 0 | 1 | 0 | 1 |
| 0 | 1 | 0 | 1 | 0 | 1 |
| 1 | 1 | 0 | 1 | 1 | 0 |
| 0 | 0 | 1 | 1 | 0 | 0 |
| 1 | 0 | 1 | 1 | 1 | 0 |
| 0 | 1 | 1 | 1 | 1 | 0 |
| 1 | 1 | 1 | 1 | 1 | 0 |

*FIG. 6a.*

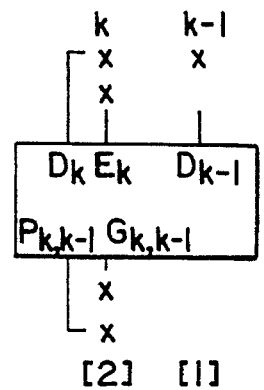
FIG. 6b.
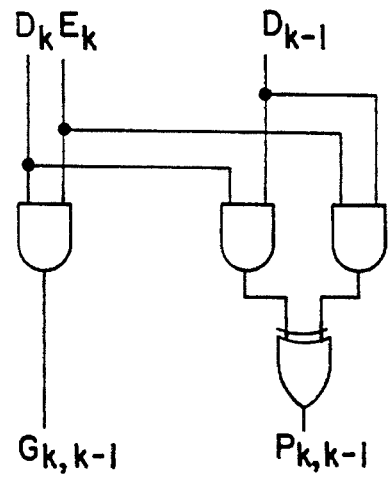
FIG. 6c.
| 62 | | | 64 | |
|---|---|---|---|---|
| $P_k$ | $D_{k-1}$ | $C_{k-1}$ | $S_k$ | $S_{k-1}$ |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 1 | 0 |
| 1 | 0 | 1 | 1 | 1 |
| 1 | 1 | 0 | 1 | 1 |
| 1 | 1 | 1 | 0 | 0 |
60
FIG. 7a.

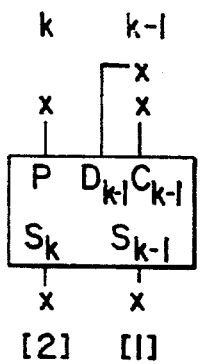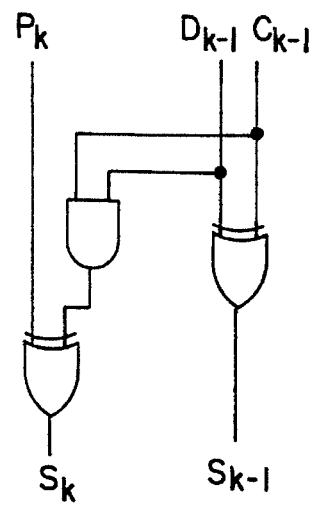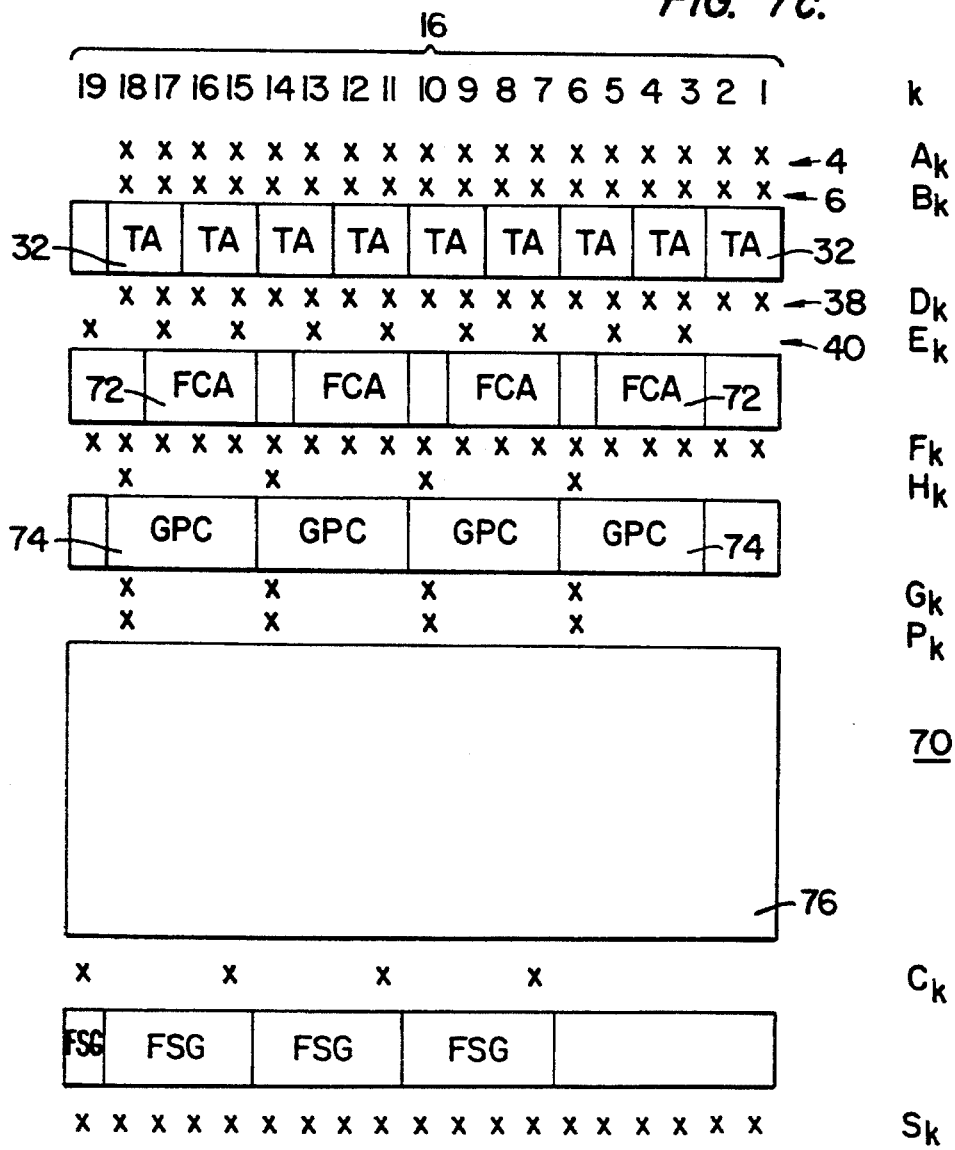
FIG. 7b.
FIG. 7c.
FIG. 8.

|   | $E_{k+2}$ |   | $E_k$ |
|---|---|---|---|
|   | $D_{k+2}$ | $D_{k+1}$ | $D_k$ |
| $H_{k+3}$ | $F_{k+2}$ | $F_{k+1}$ | $F_k$ |
FIG. 9a.
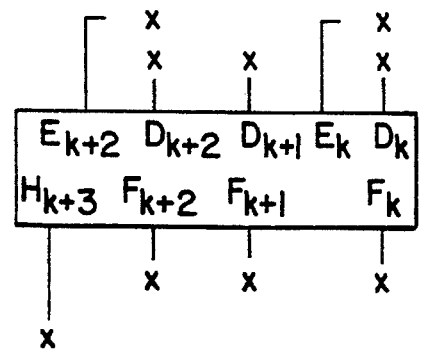
FIG. 9b.
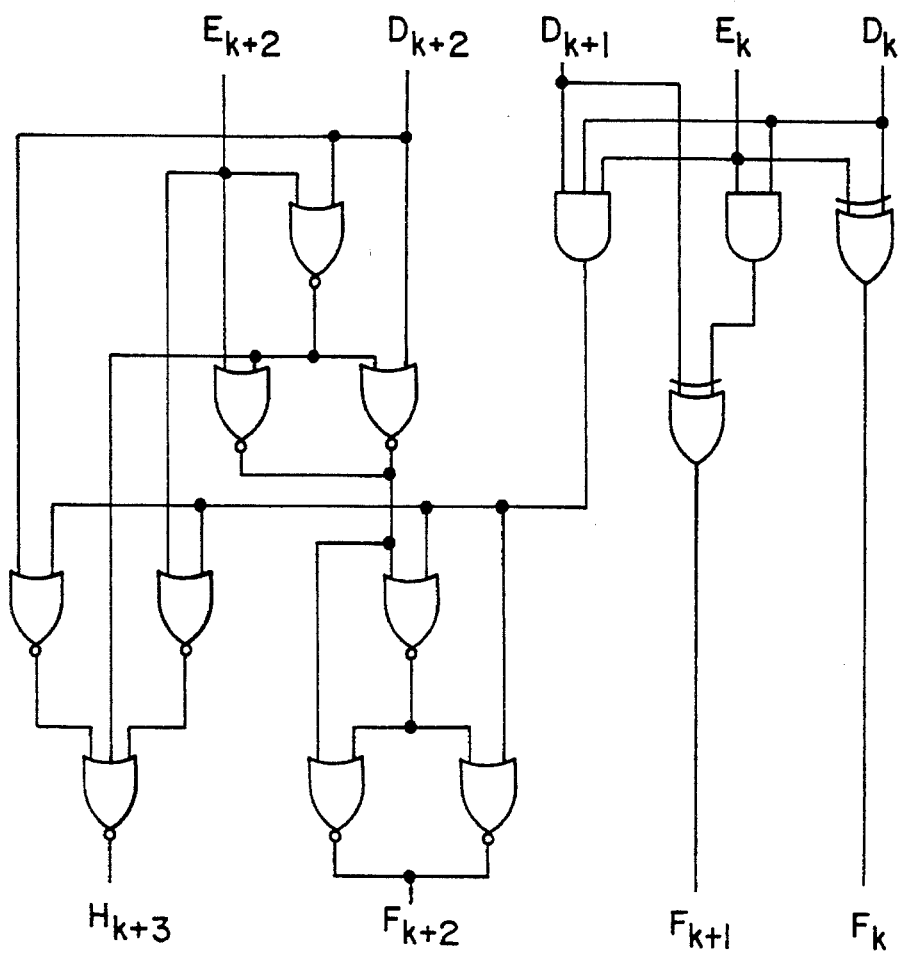
FIG. 9c.

```
 19 18 17 16 15 14 13 12 11 10 9 8 7 6 5 4 3 2 1      k x  x  x  x  x  x  x  x  x  x  x x x x x x x x x   Aₖ
    x  x  x  x  x  x  x  x  x  x  x x x x x x x x x   Bₖ
    [ TA | TA | TA | TA | TA | TA | TA | TA | TA ]
    x  x  x  x  x  x  x  x  x  x  x x x x x x x x x   Dₖ
 x     x     x     x     x     x   x   x   x          Eₖ
    [ FCA  |  FCA  |  FCA  |  FCA  ]
    x  x  x  x  x  x  x  x  x  x x x x x x x x x x   Fₖ
          x              x              x              Hₖ
    [   FCA   |         FCA         ]
    x  x  x  x  x  x  x  x  x  x x x x x x x x x x   Fₖ
 x                 x                                   Hₖ
    [         FCA            |                   ]—92
    x x x x x x x x x x x x x x x x x x —8            Sₖ
 90
```

REDUCING THE NUMBER OF CARRY-LOOK-AHEAD ADDER STAGES IN HIGH-SPEED ARITHMETIC UNITS, STRUCTURE AND METHOD

BACKGROUND OF THE INVENTION

This invention relates to a method and apparatus for digital addition, and in particular, to a method and apparatus for structuring a carry-look-ahead adder.

The carry-look-ahead adder (CLA) is a key element in digital computers. It is an integral element in the efficient implementation of high-speed arithmetic units and is used in most arithmetic operations, including addition, subtraction, multiplication, division, and square root. The adder function requires complex circuitry for fast implementation, and can be a bottleneck to speed. Thus, performance improvements in the carry-look-ahead adder directly affect computer performance in computationally intensive applications.

In a conventional M-bit carry-look-adder, a pair of M-bit input numbers are used to obtain the associated generate and propagate values. The conventional carry-look-ahead adder implementation then requires 2ceiling[log(M)]-1 stages for the calculation of the carry-in for each column using the generate and propagate values. For example, with a fan-in limit of four, four bits of input data require one stage, sixteen bits require three stages, and sixty-four bits require five stages. In the final step, the carry-ins are combined with the two M-bit inputs to produce the sum.

The computational speed of the adder is proportional to log(M). Since the number of stages required in a given computation directly affects the overall speed of the arithmetic operation, the implementation of a CLA with fewer stages is desirable. It is true that the number of gate delays in each CLA stage is implementation dependent. Nevertheless, as demonstrated, the number of stages in the CLA increases with the log of the number of input bits, thereby increasing the net delay through the adder. In other words, a large number of input bits materially affects CLA speed and, as a result, processor speed. Therefore, a reduction in the number of stages in a carry-look-ahead adder would materially improve the speed of a given arithmetic unit in a digital computer.

SUMMARY OF THE INVENTION

According to the invention, an add circuit for adding an addend and an augend and generating a final sum is described. The addend, augend, and final sum are binary numbers, each having a plurality of bits. Bits of the same order in the addend and the augend are organized into 2-bit columns. The add circuit comprises at least one data reduction stage, each data reduction stage comprising at least one multi-column full adder. The data reduction stages use the columns of addend and augend bits to generate a reduced addend and a reduced augend, with the reduced augend having fewer bits than the original augend. A generate/propagate calculation stage then uses the reduced addend and the reduced augend for calculating generate and propagate data, the generate/propagate calculation stage having been modified to account for the reduction of the addend and augend. A carry-generate stage then uses the generate and propagate data to generate at least one final carry. Finally, a final sum calculation stage uses the reduced addend, the reduced augend, and the final carries for calculating the final sum. The data reduction stages reduce the inputs to the generate/propagate calculation stage thereby reducing the number of inputs to the carry-generate circuit. With fewer inputs, the number of stages in the carry-generate circuit can be reduced, thus resulting in a faster implementation of the carry-look-ahead adder.

An additional embodiment exists wherein the data reduction stages operate only on specified groups of consecutive columns of addend and augend bits. These are usually the columns which are at either end of the array of columns generated by a carry-save adder in a binary multiplier. Because column data toward the ends of the array arrive earlier than column data toward the center of the array, reducing operations are performed only on the earlier arriving columns.

In another embodiment for use in a rounding circuit, the generate/propagate calculation stage is modified to produce a generate and a propagate for a group of consecutive columns where the augend bit for each of the consecutive columns is known to be logic zero. The generate for the consecutive columns is equal to logic zero and the propagate is equal to the logical AND of the addend bits in the consecutive columns.

A further understanding of the nature and advantages of the present invention may be realized by reference to the remaining portions of the specification and the drawings.

BRIEF DESCRIPTION OF THE DRAWINGS

FIG. 2a is a function table of the one-column generate/propagate function.

FIG. 2b is a schematic of a one-column generate/propagate function.

FIG. 3a is a function table of the final sum from the carry-generate of the carry-look-ahead adder.

FIG. 3b a schematic of the final sum from the carry-generate of the carry-look-ahead adder.

FIG. 6a is a function table of the two-column generate/propagate function.

FIG. 6b is a simplified schematic representation of the two-column generate/propagate function.

FIG. 6c is a schematic of modified two-column generate/propagate function.

FIG. 7a is a function table of the modified final sum from the carry-generate of the carry-look-ahead adder.

FIG. 7b is a simplified schematic representation of the modified final sum from the carry-generate of the carry-look-ahead adder.

FIG. 7c is schematic of the modified final sum from the carry-generate of the carry-look-ahead adder.

FIG. 8 is a diagram illustrating operation of a modified carry-look-ahead adder with two levels of input data reduction.

FIG. 9a is a function table associated with the modified three column add function.

FIG. 9b is a diagram illustrating a simplified schematic representation of the modified three-column adder.

FIG. 9c is a schematic of the modified three column add circuit.

FIG. 13 is a diagram illustrating operation of a modified carry-look-ahead adder with four levels of input data reduction.

FIG. 14a is a simplified block diagram illustrating the binary multiply function.

DESCRIPTION OF SPECIFIC EMBODIMENTS

The invention will be generally described using a conventional carry-look-ahead adder as the starting point. Following the general description several specific applications will be presented. These applications include a modified carry-look-ahead adder as a complete add unit, a binary multiplier, and an adder where one input is not fully populated.

Modified carry-look-ahead adders can be constructed according to the invention, as a complete unit; that is, one in which the add function is carried out internally. This eliminates the need for a carry-generate circuit. Furthermore, as will be discussed, modified carry-look-ahead adders can be employed in binary multipliers. Specifically, the invention is useful where some of the column calculations of the multiplier's carry-save adder (which generates the input data for the CLA) are completed before other columns calculations. The fact that some data arrive at the CLA before others allows for modifications to this "intermediate data" during the interim time period. This intermediate data can be processed to reduce the number of input bits to the carry-generate circuitry while the CLA awaits the arrival of the later data. Rounding adders add two numbers where one of the numbers is not fully populated. Modifications to the carry-look-ahead adder for this type of application will be shown to materially reduce the complexity of the adder's carry-generate stage.

Conventional Carry-Look-Ahead Adder

Figure 1:
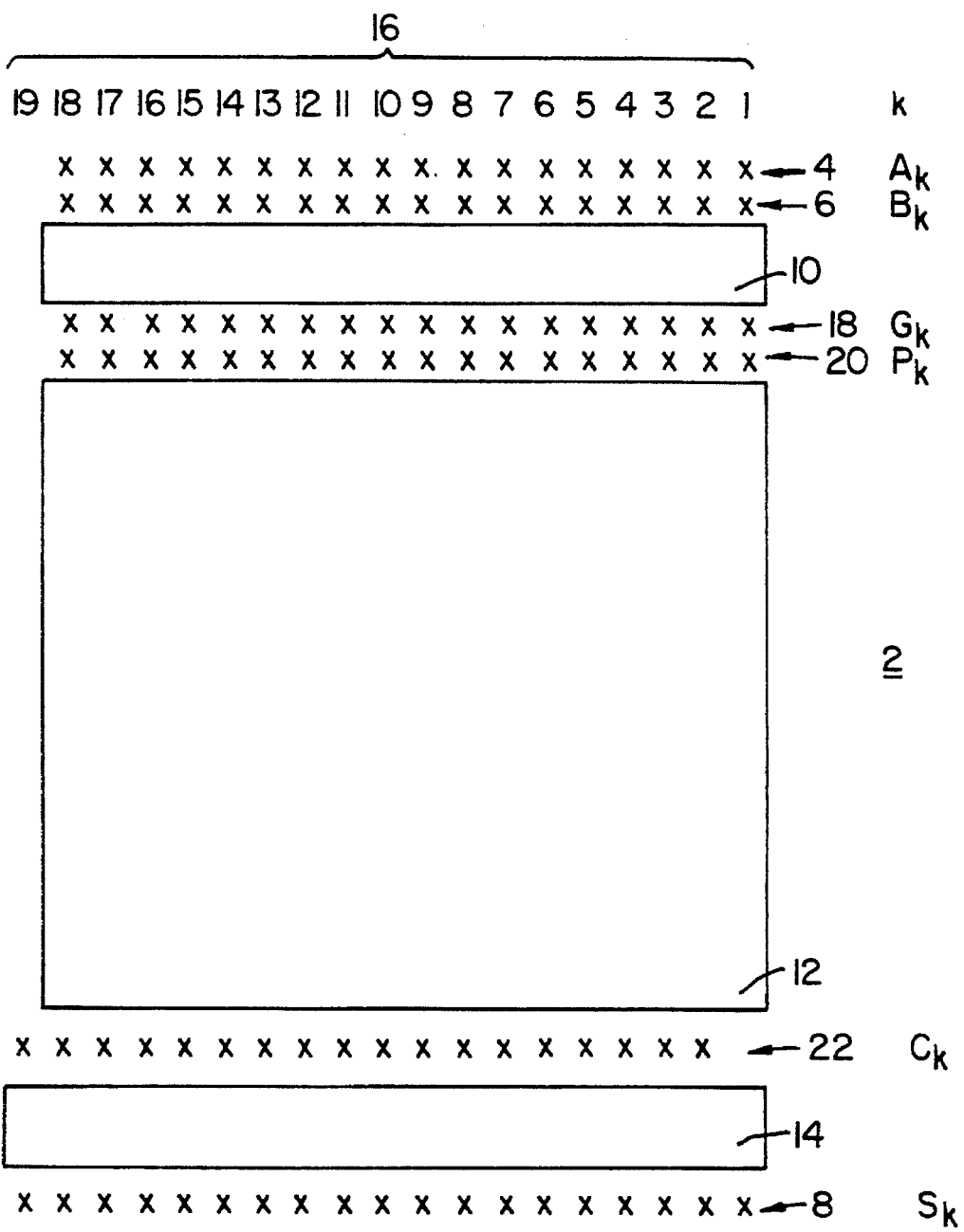
FIG. 1 is a diagram illustrating operation of a conventional carry-look-ahead adder.

FIG. 1 is an illustration of a conventional carry-look-ahead adder (CLA) 2. This particular implementation is for processing two 18 bit numbers (4 and 6) and calculating a final result 8. The conventional configuration comprises three subsections: the generate/propagate calculation stage 10; the carry-generate stage 12; and the final sum stage 14. In FIG. 1, the calculation is shown proceeding down the page, and relative data bit positions are shown with Xs arranged in columns 16 one through nineteen (right to left). A general column subscript k is employed for further discussion of initial, intermediate, and final results.

The generate-propagate calculation is performed by the generate/propagate circuitry 10 (GPC), using the addend 4 and augend 6 as input data, and calculating the generate and propagate data (18 and 20) for each column 16. For each bit position (k), the generate and propagate bits are represented by the following equations:

$$G_k = A_k B_k \quad (1)$$

$$P_k = A_k \text{ xor } B_k \quad (2)$$

where, $A_k$ and $B_k$ are the addend bit and the augend bit respectively. These equations indicate that this data is derived exclusively from a single column 16 of data (k) with the results being associated with that same column 16. The function table for these equations are shown in FIG. 2a, and the circuit schematic to accomplish these generate/propagate calculations is shown in FIG. 2b.

These data 18 and 20 are then directed to the carry-generate circuit 12. The carry-generate circuit 12 in FIG. 1 is also a conventional configuration, providing for eighteen sets of input generates 18 and propagates 20. The carry-generate circuit 12 requires five stage or eighteen input bits if the fan-in is limited to four; three stages if the fan-in is five. The result of the carry-generate calculation is a set of carries 22, the $C_k$ of FIG. 1. The carry produced by column k-1 is given the name $C_k$ because it is combined with $P_k$ Of column k in the final sum circuit 14 to obtain the final sum 8 ($S_k$). For a conventional final sum calculation, where the $C_k$ are calculated by the carry-generate circuit 12, the final sum bits 8 are calculated in the following manner:

$$S_k = P_k \text{ xor } C_k \quad (3)$$

or, substituting for $P_k$ from equation (2), $$S_k = (A_k \text{ xor } B_k) \text{ xor } C_k \quad (4)$$

The function table for the final sum calculation is shown in FIG. 3a, and the schematic for this circuit is illustrated in FIG. 3b. This completes the description of the conventional carry-look ahead adder 2.

Modified Carry-Look-Ahead Adder

Figure 4:
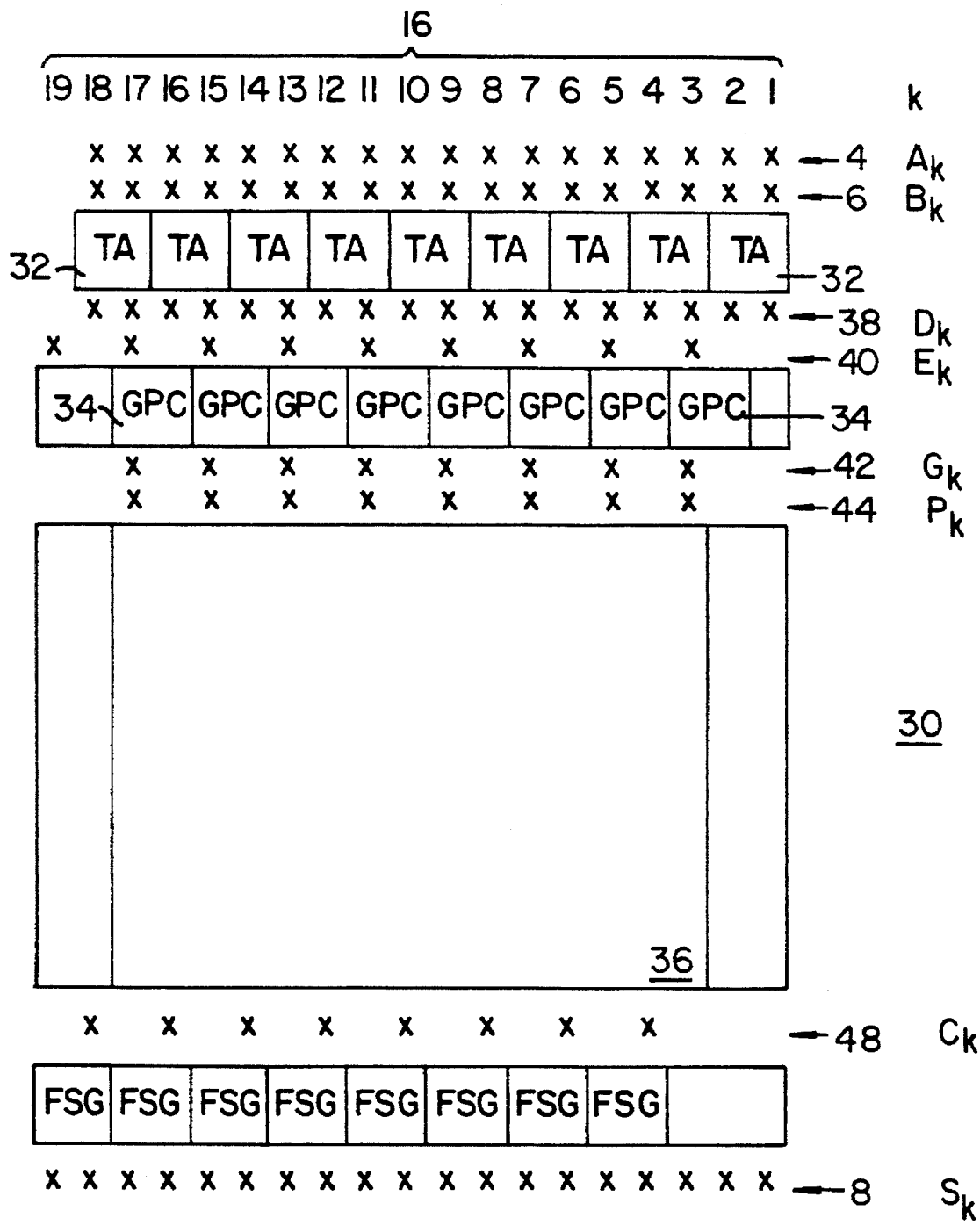
FIG. 4 is a diagram illustrating operation of a modified carry-look-ahead adder.

Consider a modified carry-look-ahead adder 30, as shown in FIG. 4. As shown, a set of two-column full adders 32 (TA) are interposed between the addend 4 and augend 6 and the generate/propagate circuitry 34. This circuit modification reduces the number of bits directed to the carry-generate circuit 36, resulting in a reduction in the number of stages required in the carry-generate circuit 36. TAs 32 are used here to modify the data bit stream in the following manner. The operational characteristics of the two-bit adder 32 (TA) are illustrated in the function table 50 shown in FIG. 5a. The input data ports 52 are described by $A_k$, $B_k$, $A_{k+1}$, and $B_{k+1}$; the output ports 54 by $D_k$ (sum zero), $D_{k+1}$ (sum 1), and $E_{k+2}$ (carry-out). The function table 50 shows the output data as a function of all sixteen possible combinations of four input binary data. The functional characteristics of the TA 32 also show that the $A_{k+1}$ and $B_{k+1}$ inputs are to be considered as associated with next higher order bit. With regard to the outputs, $D_{k+1}$ is to be considered as associated with the next higher order bit, and $E_{k+2}$ is considered to be associated with the second higher order bit. The function of the TA 32 is described by the following equations:

$$D_k = (A_k \text{ xor } B_k) \tag{5}$$

$$D_{k+1} = (A_{k+1} \text{ xor } B_{k+1}) \text{ xor } (A_k B_k) \tag{6}$$

$$E_{k+2} = (A_{k+1} B_{k+1}) + (A_{k+1} A_k B_k) + (B_{k+1} A_k B_k) \tag{7}$$

Figures 5A, 5B:
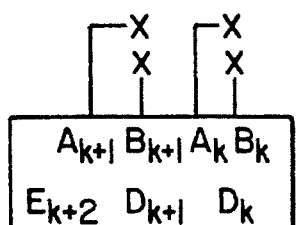
FIG. 5a is a function table of a two-bit full adder showing output signal characteristics versus input signal levels.
FIG. 5b is a diagram illustrating a simplified schematic representation of the two-bit full adder.
Figure 5C:
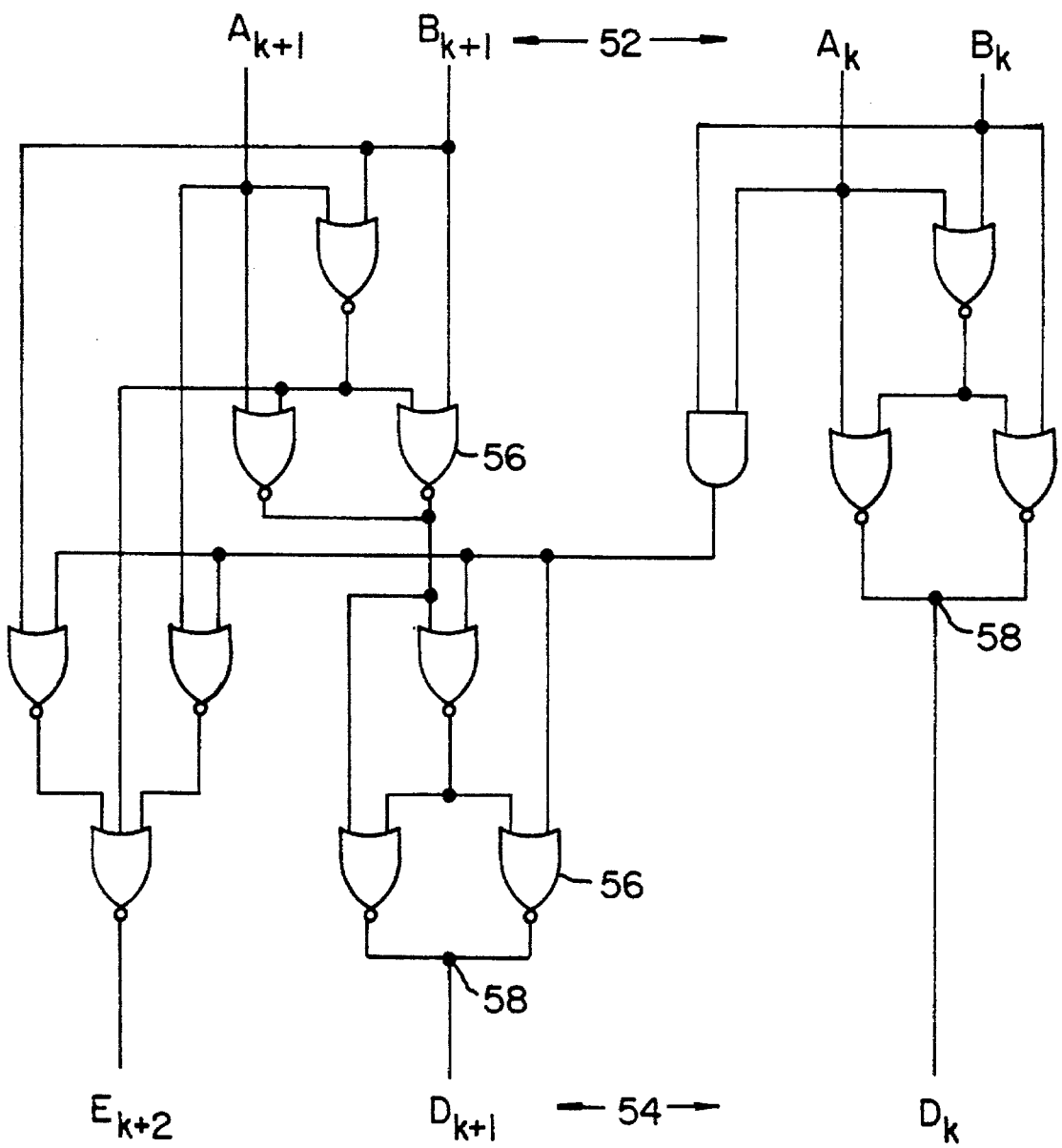
FIG. 5c is a schematic of the two bit full adder implemented with two- and three-input NOR logic and wired OR logic.

A particular implementation of a TA 32 is shown schematically at the gate level in FIG. 5c. In this example, the TA function is generated using NOR logic elements 56 and wired OR elements 58, with inputs 52 and outputs 54 indicated at the top and the bottom respectively. This circuit exactly fulfills the characteristics of the function table 50 of FIG. 5a. The detailed columnar representation which relates to the example illustration of FIG. 4 is shown in FIG. 5b. FIG. 5b also illustrates the data reduction characteristics. That is, with two bits from two adjacent columns of the addend and augend, the TA yields three output bits distributed over three columns. One of these bits is a carry-out bit, which extends to the next higher order column for the given input bit order.

This process eliminates every other augend bit in the resulting data which are referred to as the reduced addend 38, $D_k$, and the reduced augend 40, $E_k$. This reduced data is then input to a set of modified generate and propagate circuits 34 which are appropriately modified to account for the previous reduction of input data. That is:

$$G_k = 0, \tag{8}$$

$$\text{and } P_k = D_k \tag{9}$$

for the columns where $E_k$, the reduced augend 40, has been set zero (in this case, k even).

For all practical purposes, the $E_k$, for k even, is to be considered as eliminated. This is reflected in the absence of the placeholder, X, in the resulting data, as shown in the FIG. 4. For adjacent bit pairs (k and k−1, k odd), the generate and propagate bits (42 and 44) are:

$$G_{k,k-1} = G_k + P_k G_{k-1}, \tag{10}$$

$$P_{k,k-1} = P_k P_{k-1} \tag{11}$$

The function table representative of these two column generate/propagates is shown in FIG. 6a. Substitution into equations (10) and (11) yields:

$$G_{k,k-1} = G_k \tag{12}$$
$$= D_k E_k \tag{13}$$

$$P_{k,k-1} = (D_k \text{ xor } E_k) D_{k-1} \tag{14}$$
$$= (D_k D_{k-1}) \text{ xor } (E_k D_{k-1}) \tag{15}$$

for the adjacent columns, with k corresponding to the columns in which both D and E may be non-zero. These results are illustrated in the first eight entries of the function table of FIG. 6a, i.e., with $E_{k-1}=0$, which corresponds to the present data conditions. FIG. 6b shows the detailed representation for this modified generate/propagate. FIG. 6c shows a schematic representation of the circuit that is employed to achieve the required calculation.

These data 42 and 44 are then directed to the carry-generate circuit 36. The carry-generate circuit 36 in FIG. 4 is a conventional configuration, except in this embodiment it only uses eight sets of input generates 42 and propagates 44 versus the conventional eighteen sets used by the embodiment of FIG. 1. Because of the fewer inputs, this embodiment requires fewer stages for the carry-generate 36 than for the completely conventional carry-look-ahead adder (i.e., if the fan-in limit is four, three stages are required instead of five).

The final sum bits ($S_k$) 8 are calculated as follows:

$$S_k = D_k \text{ xor } C_k, \text{ for k even} \tag{16}$$

$$S_k = P_k \text{ xor } (D_{k-1} C_{k-2}), \text{ for k odd} \tag{17}$$

The $C_k$ are the final carries 48, and are calculated by the carry-generate circuitry 36.

The function table 60 for the final sum calculation is shown in FIG. 7a. The inputs 62 $P_k$, $D_{k-1}$, and $C_{k-1}$, are associated with two adjacent columns and yield two column results 64, $S_k$ and $S_{k-1}$ (k odd). The detailed block schematic for this circuit is illustrated in FIG. 7c, and a columnar representation is shown in FIG. 7b. This completes the description of a single level of modification to the carry-look-ahead adder.

Further Modified Carry-Look-Ahead Adder

Consider a further modification resulting in the carry-look-ahead adder 70 of FIG. 8. In addition to a set of TAs 32 interposed between the input data (addend 4 and augend 6) and the generate/propagate circuitry 74, there is a set of modified three-column adders 72 (FCAs) following the set of TAs 32. This additional circuitry provides a second level of data reduction, further reducing the number of bits directed to the carry-generate circuit 76. This results in a further reduction in the number of stages required in the carry-generate circuit 76.

The TAs 32 eliminate every other carry bit in the augend 6. The interposition of the additional set of modified three-column adders 72 (FCAs) as a second level of data reduction again eliminates every other carry bit in the augend 6. A table showing the columnar interrelationships for an FCA 72 is shown in FIG. 9a. The inputs $D_k$, $E_k$, $D_{k+1}$, $D_{k+2}$, and $E_{k+2}$, are associated with three adjacent columns and yield four column results, $F_k$, $F_{k+1}$, $F_{k+2}$, and $H_{k+3}$. The detailed columnar representation for this circuit is illustrated in FIG. 9b. A typical circuit schematic for the modified three-column adder 72 is shown in FIG. 9c. This circuit has a signal propagation delay which is about the same as a TA 32 or a one-bit full adder.

The twice reduced data is input to a set of modified generate and propagate circuits 74 which are designed to account for the reduction of the input data. In this example, columnar data is reduced by a factor of four. For four adjacent columns, the generate and propagate bits are:

$$G_{k,k-3} = G_k + P_k G_{k-1} + P_k P_{k-1} G_{k-2} + P_k P_{k-1} P_{k-2} G_{k-3} \tag{18}$$

$$P_{k,k-3} = P_k P_{k-1} P_{k-2} P_{k-3} \tag{19}$$

For the reduced data ($H_{k-1} = H_{k-2} = H_{k-3} = 0$), we get $$G_{k,k-3} = F_k H_k \tag{20}$$

$$P_{k,k-3} = (F_k \text{ xor } H_k) F_{k-1} F_{k-2} F_{k-3} \tag{21}$$

Figure 10:
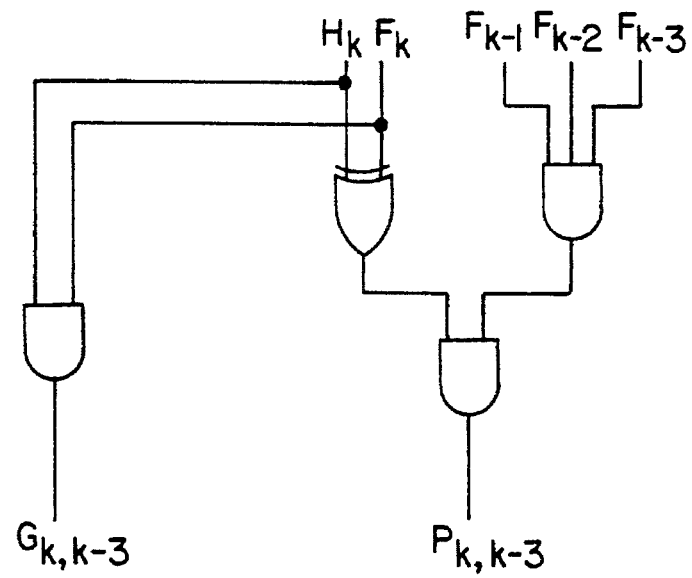
FIG. 10 is a schematic of a modified four-column generate/propagate function of the modified carry-look-ahead adder.

A circuit schematic for these computations is shown in FIG. 10.

This data is then directed to the carry-generate circuitry 76. The carry-generate circuit 76 is a conventional configuration, except that, in this case, it only has four sets of generates and propagates as inputs, thus requiring even fewer stages than either of the previous examples. For example, only one stage is needed if a fan-in of four or more is permitted.

For the final sum calculation, where the $C_k$ are calculated by the carry-generate circuitry, the final sum bits are calculated using equations (3) or (4). Thus, the final sum bits ($S_k$) for this configuration are calculated as:

$$S_k = F_k \text{ xor } C_k \quad (22)$$

for the first column, $$S_{k+1} = F_{k+1} \text{ xor } (F_k C_k) \quad (23)$$

for second column, $$S_{k+2} = F_{k+2} \text{ xor } (F_{k+1} F_k C_k) \quad (24)$$

for the third column, and $$S_{k+3} F_{k+} \text{xor } (F_{k+2} F_{k+1} F_k C_k) \quad (25)$$

for the fourth column. Furthermore, an intermediate result $L_{k+1}$ may be computed as follows:

$$L_{k+1} F_{k+1} F_k \quad (26)$$

This intermediate result can be computed before $C_k$ is available, so that the actual calculation of $S_{k+2}$ is no more complex than for $S_{k+1}$; i.e.:

$$S_{k+2} = F_{k+2} \text{ xor } (L_{k+1} C_k) \quad (27)$$

Likewise, another intermediate result $L_{k+2}$ may be calculated as follows:

$$L_{k+2} = F_{k+1} F_{k+1} F_k \quad (28)$$

This intermediate result is also available before $C_k$ is available, so that this final result calculation is again no more complex than for $S_{k+1}$; i.e.:

$$S_{k+3} = F_{k+} \text{xor } (L_{k+2} C_k) \quad (29)$$

Figure 11:
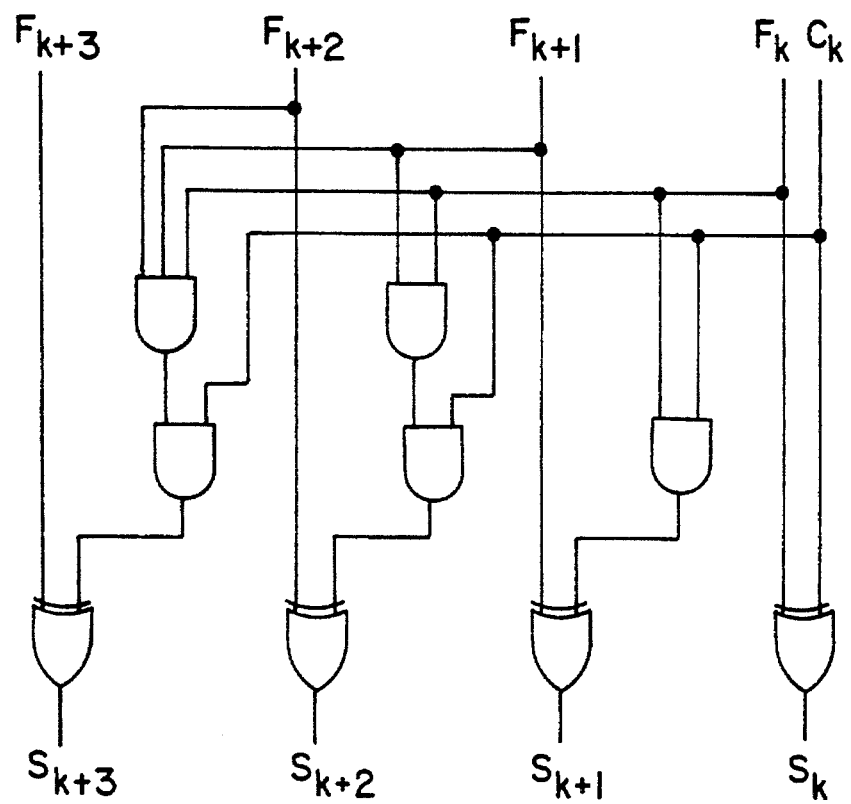
FIG. 11 is schematic of the modified final sum from the carry-generate of the modified carry-look-ahead adder.
Figure 12:
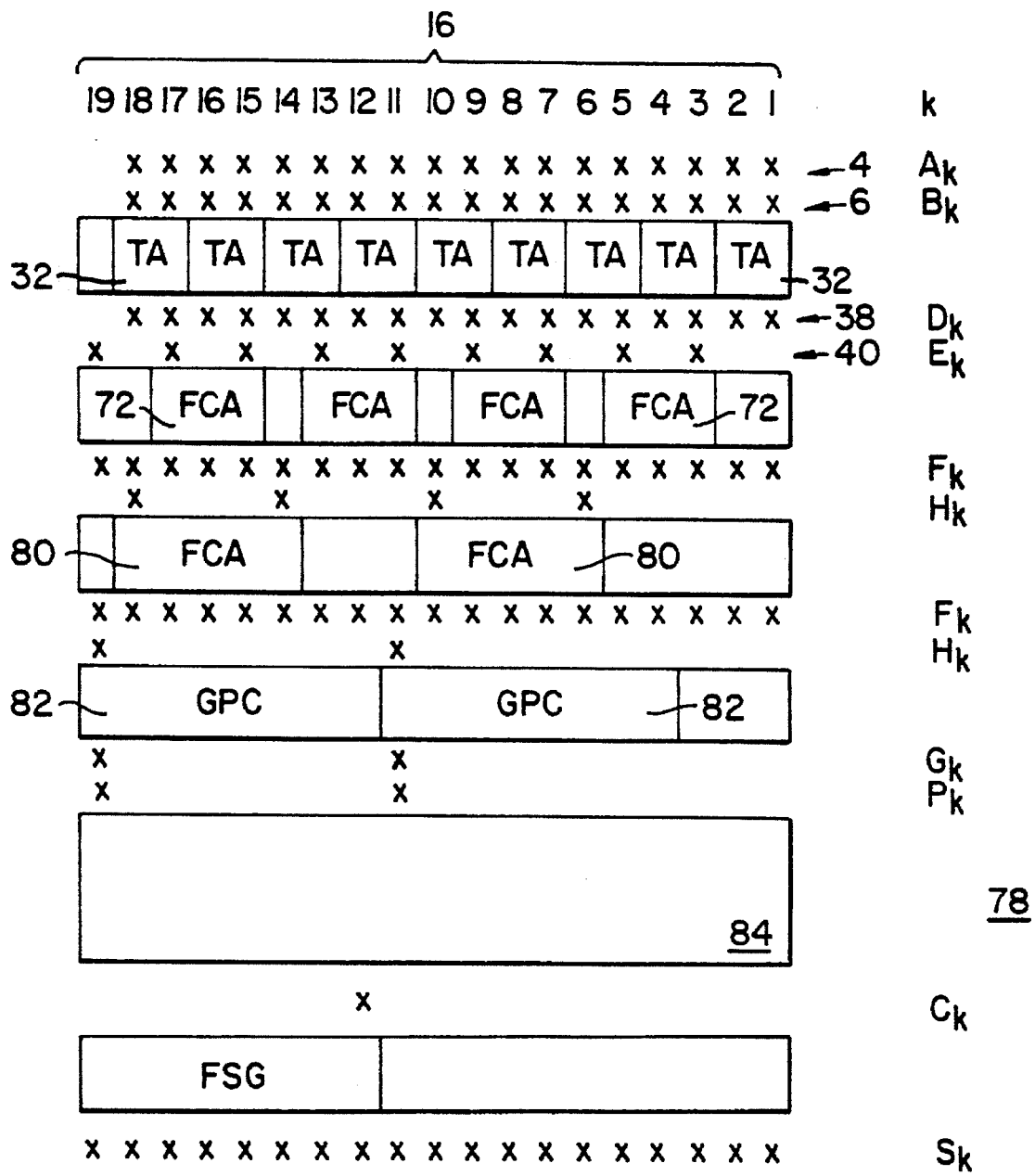
FIG. 12 is a diagram illustrating operation of a modified carry-look-ahead adder with three levels of input data reduction.

The circuitry for the four-to-one final sum calculation is shown in FIG. 11. It is noteworthy that the limitation on data reduction going to larger ratios are only limited by the practical fan-in capability of a particular technology. FIG. 12 shows an example of even further modifications along the same lines presented herein. A third level of data reduction 80 is included just prior to the calculation of the generates $G_k$ and propagates $P_k$. As shown, the resulting input data to the carry-generate stage 84 are reduced to two columns, with a single column for the final carry $C_k$. The circuitry required for these additional data reductions is analogous to the circuitry described above, and is a straightforward extension of the above derivations.

Figures 13, 14A:
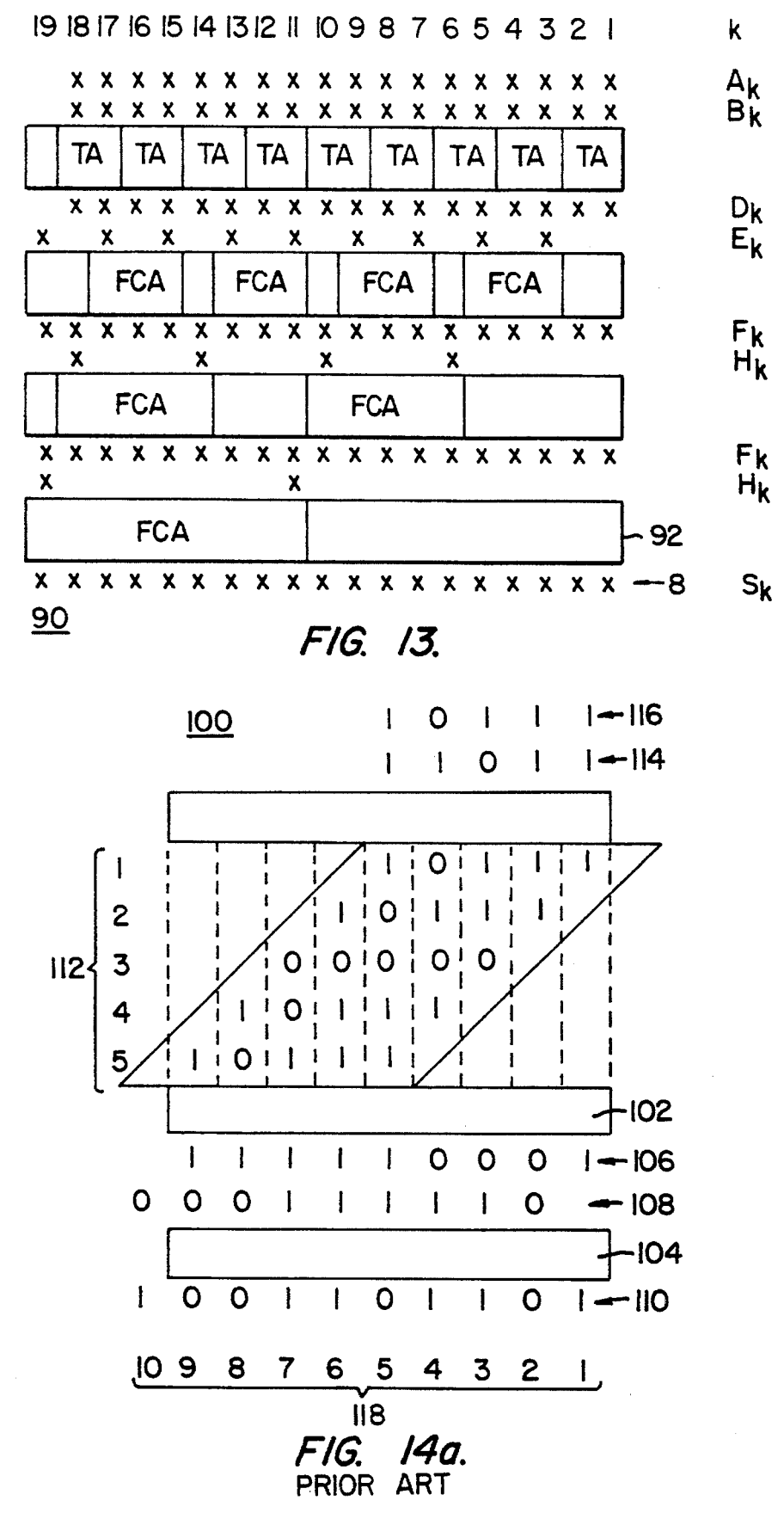

FIG. 13 shows a limiting case for incorporating data reduction modifications in an 18 bit input CLA 90. In this case, the interposition of a fourth level of data reduction 92 eliminates the augend bits altogether, yielding the final sum 8 directly.

This completes the description of the approach taken for the modifications to a conventional carry-look ahead adder. Specific applications incorporating the above described invention follow.

Binary Multipliers

Figure 14B:
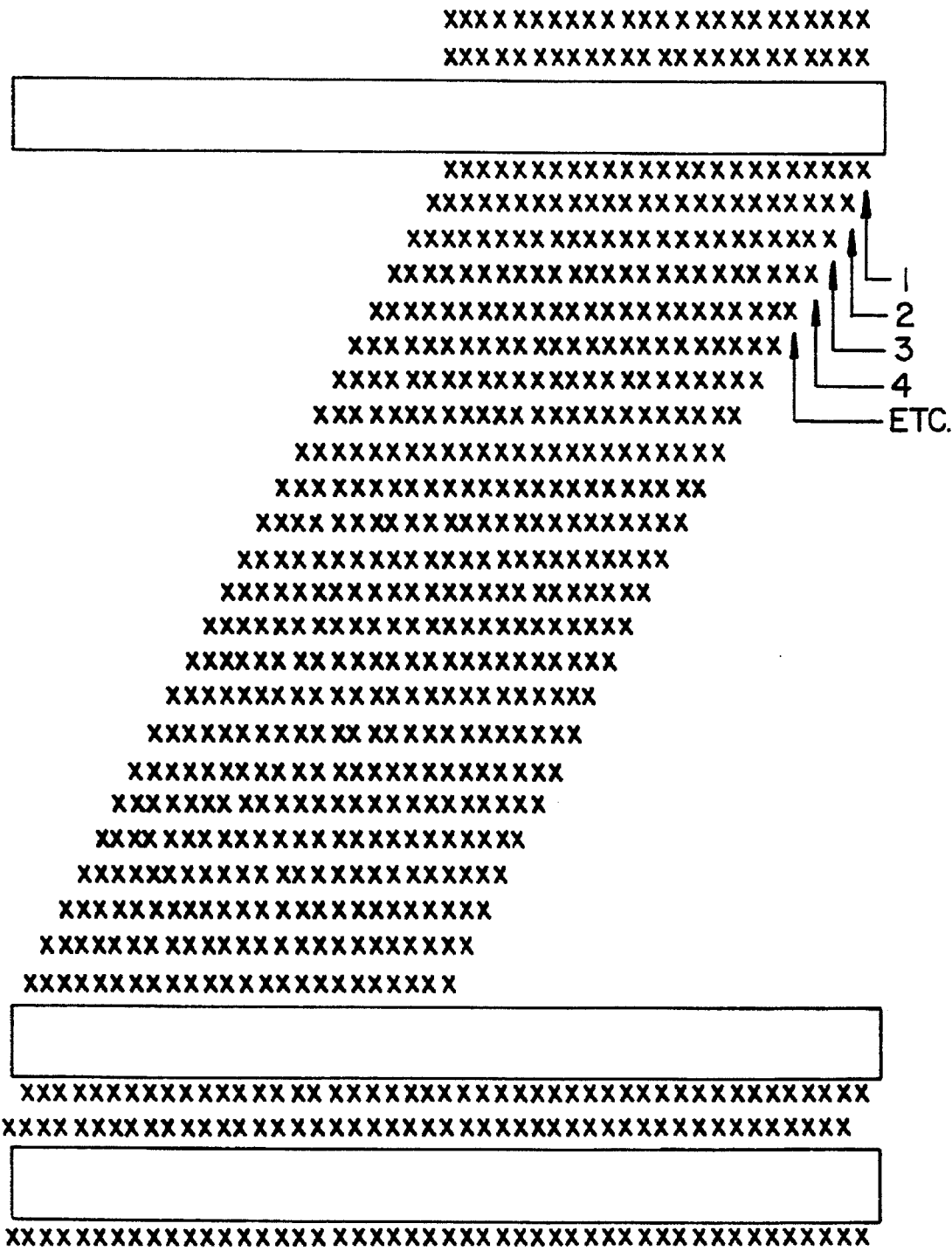
FIG. 14b is a diagram illustrating the binary multiply function.

The binary multiplier is a key element in digital computers used for computationally intensive calculations. The multiply function requires complex circuitry and thus can be a bottleneck to speed. Typical binary multipliers 100 incorporate the carry-save adder 102 and the carry-look-ahead adder 104 as basic building blocks as shown in FIGS. 14a and 14b. The carry-save adder 102 performs the intermediate column addition calculation, taking the multiplier preliminary product results and generating the partial sum 106 and partial carry 108 associated with the columnar data. In an M-bit by N-bit multiplier, N+M−1 such columns are required, with up to N bits of input per column. The carry-look-ahead adder 104 takes the results of the carry-save adder 102, i.e., the partial sums 106 and partial carries 108, and calculates the final sum 110, an M+N bit number. An illustration of the binary multiply function, using column addition is shown in FIG. 14a.

This operation is performed in the usual right to left paper and pencil method, with intermediate rows 112 resulting from the multiplication of one bit from the multiplier 114 times the multiplicand 116. That is, where the multiplier bit is a one, the resulting row 112 is a replica of the multiplicand 116, shifted to the right by the order of the multiplier bit. Where the multiplier bit is a zero, the resulting row 112 is all zeros. The rows 112 are aligned in columns 118 associated with the power of the particular bit. As a result of this process there are N+M−1 columns 118 (N being the number of bits in the multiplicand 116), in M rows (M being the number of bits in the multiplier 114). In the example there are shown a five-bit multiplier 114, a five-bit multiplicand 116, five rows 112, and nine columns 118 of intermediate data representative of the results of the bit-wise multiplication. There are also two rows, each having nine bits, labeled partial sum 106 and partial carry 108 to be discussed further on. Finally, there is the final sum 110 (ten bits long), which is the finished result of performing the summation over the columns 118. One implementation of the invention relates specifically to improvements in the structure of the carry-look-ahead adder 104 associated with the binary multiply function.

The Wallace-Tree binary adder (WTA) is the usual basic building block of the conventional carry-save adder in the binary multiplier. WTAs act as the column adders for the intermediate calculation described above, performing the intermediate columnar summation, and yielding one partial sum bit and one partial carry bit per column. In a typical implementation, there is one such WTA per column. Thus, there are N+M−1 such adders required for an N-by-M bit multiplier with up to N bits of input per WTA. There are several common implementations of a WTA in this type of application. However, in all implementations, the number of stages the data needs to pass through is proportional to the log of the number of input data bits.

Figure 15A:
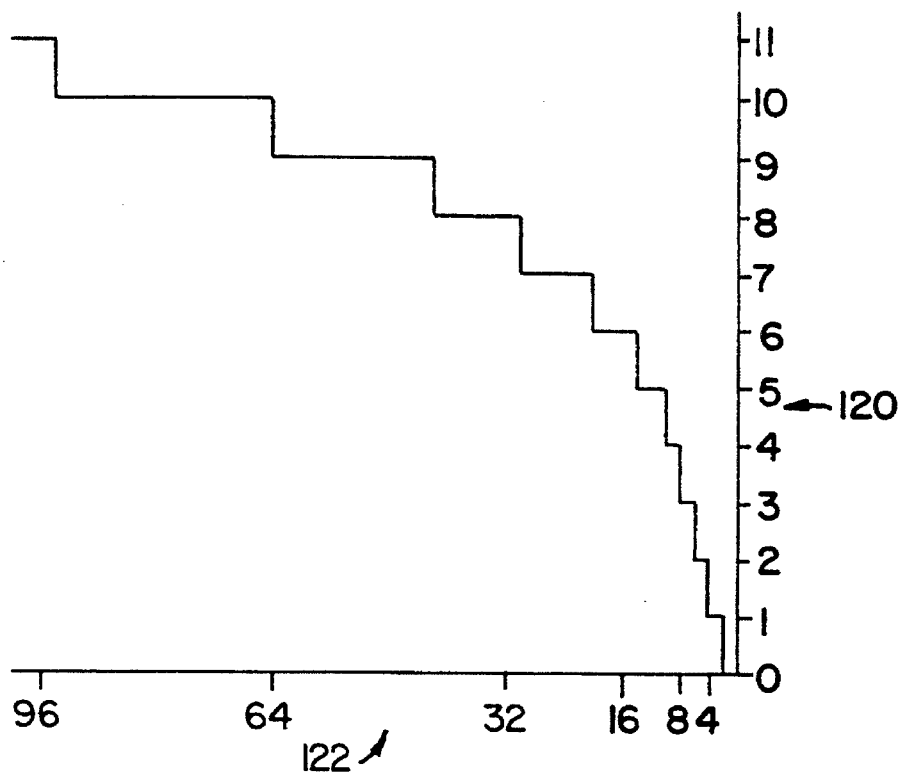
FIG. 15a is a diagram illustrating the number of FA stages required in a conventional WTA versus number of bits, assuming a fan-in of four.

FIG. 15a is an illustration showing the number of stages 120 required in a conventional WTA versus the number of input bits 122, derived from the logarithm function. The speed of an individual WTA is proportional to the number of stages 120. The N-bit WTA (i.e., the WTA performing the summation of the middle column) is inherently the slowest. It follows, then, that many of the column adders are faster than the N-bit WTA, especially those column adders for lowest and highest order bits. Thus, the results of the shorter column adders are available sooner (in time) than the results from the N-bit WTA.

The carry-look-ahead adder uses the results of the columnar adders, two bits of data per column, and calculates the final sum. It performs the intermediate calculation of the generate and propagate terms for each column, calculates carry terms from these data, and performs the final summation, employing the pair of M+N—1 bit numbers derived from the columnar adders. As discussed earlier, the carry-look-ahead adder implementation requires 2ceiling[log(M+N−1)]−1 stages for calculation of the carry ins, making the associated computational speed proportional to log(M+N).

Figure 15B:
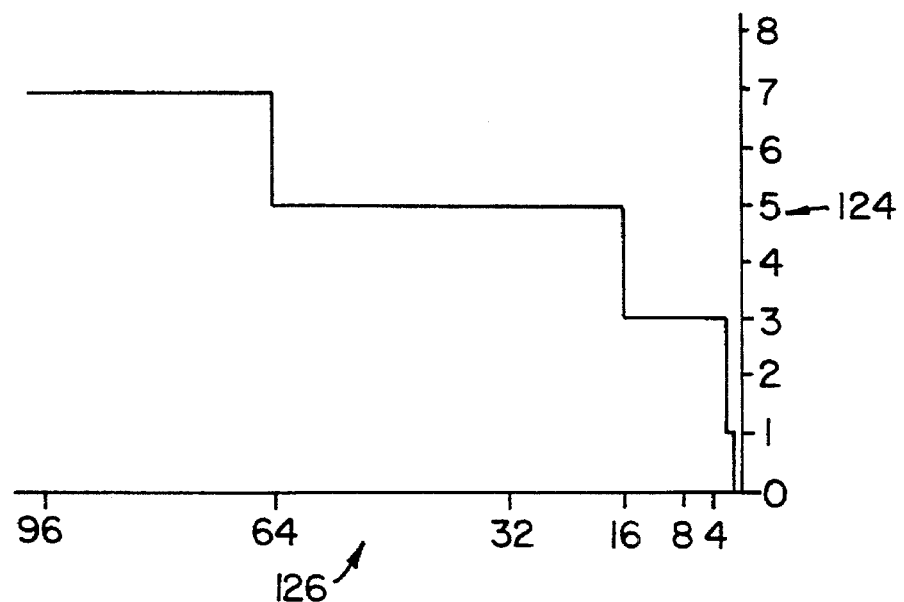
FIG. 15b is a diagram illustrating the number of stages required in a conventional Carry-Look-Ahead Adder versus number of bits, assuming a tan-in of four.

FIG. 15b is an illustration showing the number of stages 124 in the usual carry-look-ahead adder as a function of the number of input data bits 126.

Figure 16:
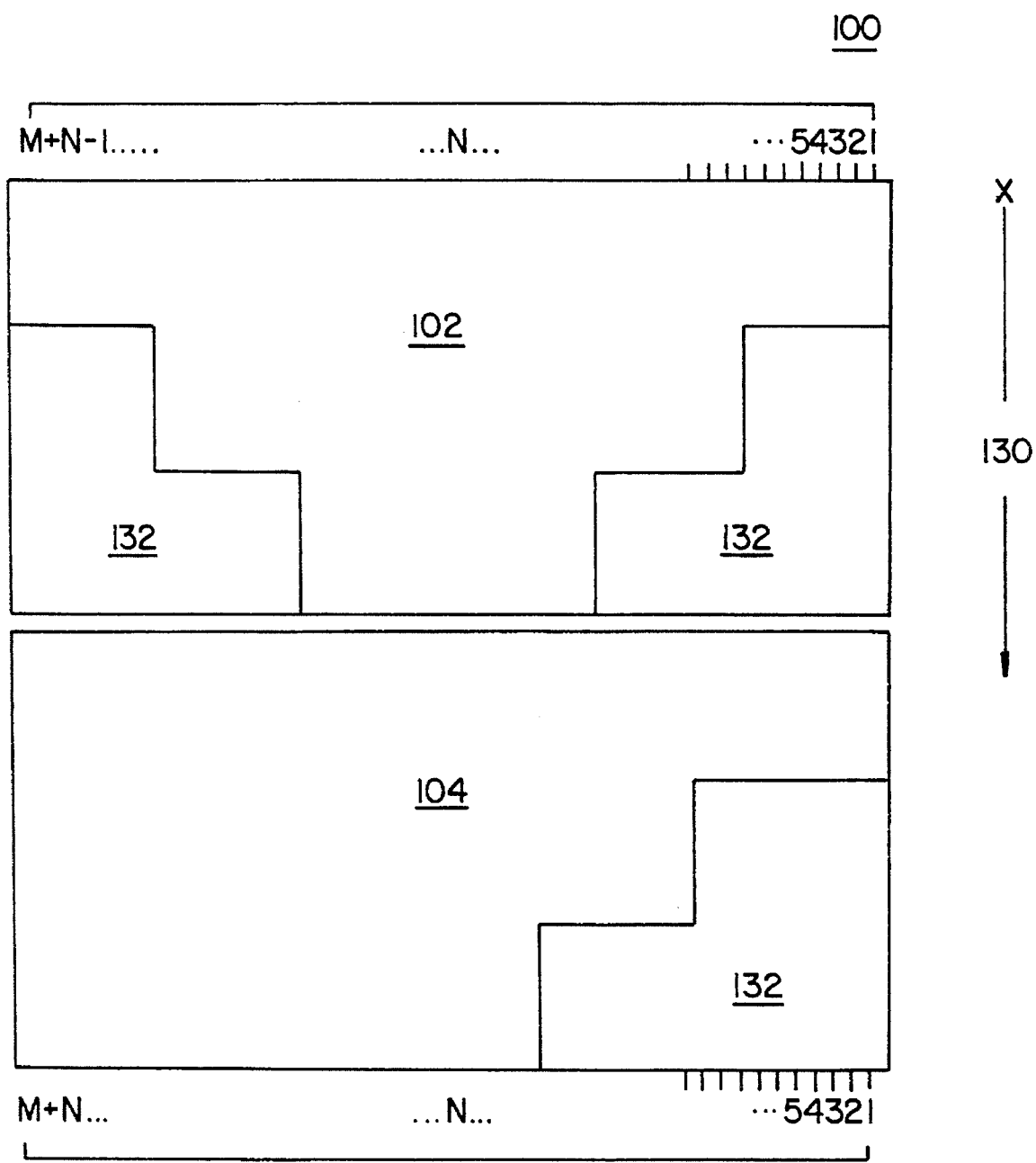
FIG. 16 is a diagram illustrating the time evolution of the multiply function versus bit position in a binary multiplier.

FIG. 16 is an illustration of the time evolution versus bit order for a conventional binary multiplier 100. The elapsed time for completion of a particular component of the calculation is shown vertically, with the positive time axis 130 oriented downward. This figure illustrates the conditions discussed thus for, namely that some of the calculations are completed before others. This is evident in both the carry-save adder 102 and the carry-look-ahead adder 104, and is represented by a "wait period" time block 132. In as much as further calculations cannot normally proceed until all intermediate calculations are completed, the earlier arriving intermediate results are held in abeyance pending completion of the critical path calculation.

Figure 17:
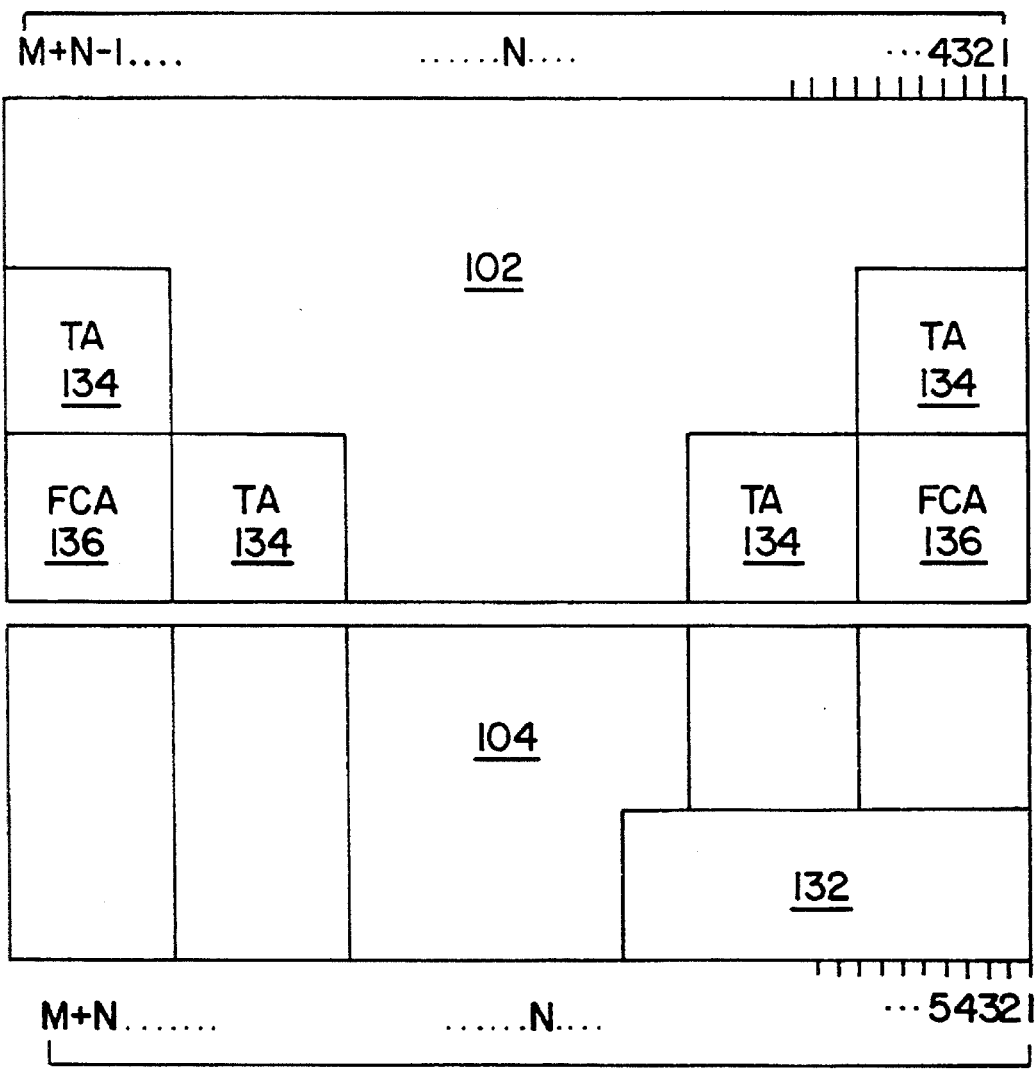
FIG. 17 is a diagram illustrating the time evolution of the multiply function versus bit position in a binary multiplier with the application of data reduction to input of carry-look adder.

According to the application of the present invention depicted in FIG. 17, the earlier arriving results may be used to perform addition computations prior to the carry-look-ahead adder in order to then reduce the number of carry-look-ahead adder stage 104, thus materially improving the speed of the binary multiplier 100. The illustration of FIG. 17 is comparable to FIG. 16, but including the following modifications. The TA 134 and FCA 136 functions can be done during what would have been the wait period 132 at no cost in time, thus reducing the number of propagate/generate columns to be processed by the carry-look-ahead adder 104. The speed of the carry-look-ahead adder 104 is determined by the number of these propagate/generate columns. Therefore, the speed of the carry-look-ahead adder 104 is improved by the reduction in the number of columns, and thereby the speed of the multiplier 100. FIG. 17 shows segments where one stage of reduction is accomplished, anti segments where two stages of reduction are accomplished. For small multiplications, only one stage of reduction may be possible or desirable, but for larger multiplications, segments where three or more stages of reduction are accomplished may be used.

Rounding Circuits

Figure 18:
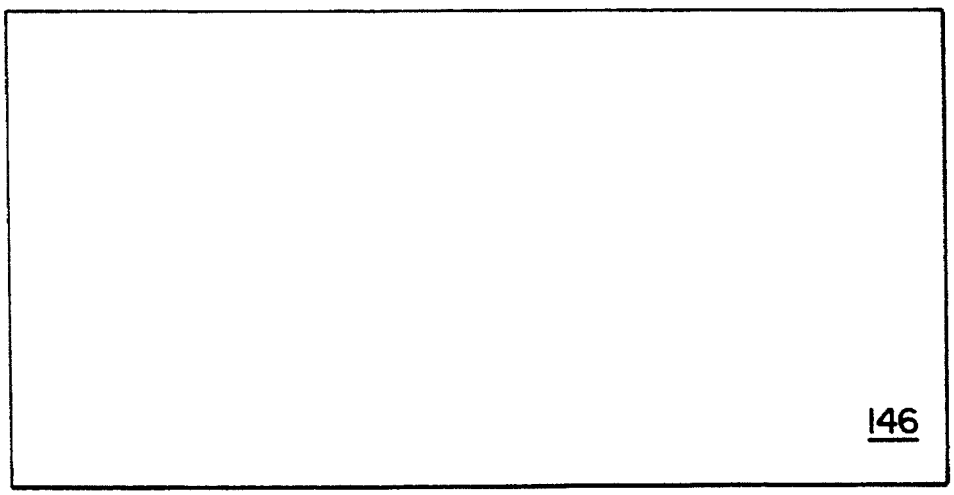
FIG. 18 is a diagram illustrating operation of a fifty-bit rounding circuit.

Another application of the invention is the rounding circuit 140 illustrated in FIG. 18. In this circuit 140, two 50-bit numbers, 142 and 144, are added in a carry-look-ahead adder 140, with one of the numbers 144 containing only four possible non-zero bits, namely columns 1, 2, 30, and 31. The conventional approach is to direct these two numbers into a 50-bit carry-look-ahead adder. Such an adder would require five stages for the addition function if the fan-in is limited to four. The approach herein is to take advantage of the zeroes in the input data bits and reduce the required number of stages. For this approach, a modified generate/propagate calculation is employed combining column data where appropriate. When several adjacent columns have the property that all the bits of one operand (say the augend) are known to always be zero, the generate for this set of columns is zero, and the propagate is the AND of the bits of the other operand (the addend) in the set of columns. In the example of FIG. 18, columnar data is reduced in this manner by factors of three and four. This carry-generate circuit 146 is a conventional configuration, except that it only has sixteen sets of input generates $G_k$ and propagates $P_k$, requiring fewer stages than for a conventional circuit configuration. If the fan-in is again limited to four, only three stages are needed instead of five.

For final sum calculation, where the $C_k$ are calculated by the carry-generate 146, the final sum bits are calculated using equations (22) through (29), previously discussed in the context of the modified carry-look-ahead adder. Additionally, in accordance with the technique described with regard to the binary multiplier, intermediate calculations using intermediate results which are available before the carry-generates may carried out to reduce the complexity of the final sum calculation, thereby increasing speed.

While the invention has been particularly shown and described with reference to specific embodiments thereof, it will be understood by those skilled in the art that the foregoing and other changes in the form and details may be made therein without departing from the spirit or scope of the invention.

What is claimed is:

1. An add circuit for adding an addend and an augend and generating a final sum, the addend, augend, and final sum each being binary numbers having a plurality of bits, the bits of the same order in the addend and the augend forming columns, the add circuit comprising:

at least one data reduction circuit, each data reduction circuit comprising at least one multi-column adder, the at least one data reduction circuit being for using the columns of addend and augend bits to generate a reduced addend and a reduced augend, the reduced augend having fewer bits than the augend; and a generate/propagate calculation circuit coupled to the at least one data reduction circuit for using the reduced addend and the reduced augend for calculating generate and propagate data, the generate/propagate calculation circuit having a number of stages, the number of stages being fewer than required to calculate generate and propagate data using the addend and the augend.

2. An add circuit as described in claim 1 wherein the at least one data reduction circuit is operable to operate only on specified groups of consecutive columns of addend and augend bits.

3. An add circuit for adding an addend and an augend and generating a final sum, the addend, augend, and final sum each being binary numbers having a plurality of bits, the bits of the same order in the addend and the augend forming columns, the add circuit comprising:

at least one data reduction circuit, each data reduction circuit comprising at least one multi-column adder, the at least one data reduction circuit for using the columns of addend and augend bits to generate a reduced addend and a reduced augend, the reduced augend having fewer bits than the augend;

a generate/propagate calculation circuit coupled to the at least one data reduction circuit for using the reduced addend and the reduced augend for calculating generate and propagate data, the generate/propagate calculation circuit having a number of stages, the number of stages being fewer than required to calculate generate and propagate data using the addend and the augend;

a carry-generate circuit coupled to the generate/propagate calculation circuit for using the generate and propagate data to generate at least one final carry; and a final sum calculation circuit coupled to the carry-generate circuit for using the propagate data and the at least one final carry for calculating the final sum.

4. An add circuit as described in claim 3 wherein the at least one data reduction circuit is operable to operate only on specified groups of consecutive columns of addend and augend bits.

5. An add circuit as described in claim 3 wherein there is only one data reduction circuit comprising a plurality of two-column full adders, the data reduction circuit for using the columns of addend and augend bits to generate a reduced addend and a reduced augend, the reduced augend having fewer bits than the augend.

6. An add circuit as described in claim 5 wherein the data reduction circuit is operable to operate only on specified groups of consecutive columns of addend and augend bits.

7. An add circuit as described in claim 3 wherein the at least one data reduction circuit comprises:

a first data reduction circuit comprising a plurality of two-column full adders, the data reduction circuit for using the columns of addend and augend bits to generate an intermediate reduced addend and an intermediate reduced augend, the intermediate reduced augend having fewer bits than the augend; and at least one intermediate data reduction circuit coupled to the first data reduction circuit, each intermediate data reduction circuit comprising at least one three-column full adder, the intermediate data reduction circuits for using the intermediate reduced addend and the intermediate reduced augend to generate the reduced addend and the reduced augend, the reduced augend having fewer bits than the intermediate reduced augend.

8. An add circuit as described in claim 7 wherein the at least one data reduction circuit is operable to operate only on specified groups of consecutive columns of addend and augend bits.

9. An add circuit for adding an addend and an augend and generating a final sum, the addend, augend, and final sum each being binary numbers having a plurality of bits, the bits of the same order in the addend and the augend forming columns, the augend having only specific non-zero bits, the add circuit comprising:

a generate/propagate calculation circuit using the columns of addend and augend bits for calculating generate and propagate data, the generate and propagate data comprising a first generate datum and a first propagate datum for each group of consecutive columns where the augend bit for each of the consecutive columns is known to be logic zero, the first generate datum equal to logic zero and the first propagate datum equal to the logical AND of the addend bits in the consecutive columns;

a carry-generate circuit coupled to the generate/propagate circuit for using the generate and propagate data to generate at least one final carry; and a final sum calculation circuit coupled to the carry-generate circuit for using the propagate data and the at least one final carry for calculating the final sum.

10. A method of adding an addend and an augend and generating a final sum, the addend, augend, and final sum each being binary numbers having a plurality of bits, the method comprising the steps of:

organizing bits of the same order in the addend and the augend into columns;

performing operations with the columns of addend and augend bits to generate a reduced addend and a reduced augend, the reduced augend having fewer bits than the augend;

calculating generate and propagate data using the reduced addend and the reduced augend;

generating at least one final carry using the generate and propagate data; and calculating the final sum using the propagate data and the at least one final carry.

* * * * *